US008462616B2

(12) United States Patent
Suberviola

(10) Patent No.: US 8,462,616 B2
(45) Date of Patent: Jun. 11, 2013

(54) APPARATUS AND METHOD FOR ESTIMATING A FREQUENCY SHIFT AND A TIME SHIFT

(75) Inventor: Ion Suberviola, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 366 days.

(21) Appl. No.: 12/845,560

(22) Filed: Jul. 28, 2010

(65) Prior Publication Data
US 2011/0032920 A1 Feb. 10, 2011

(30) Foreign Application Priority Data
Jul. 31, 2009 (DE) ..................................... 09009939

(51) Int. Cl.
*H04J 11/00* (2006.01)
*H04L 27/26* (2006.01)

(52) U.S. Cl.
CPC ................................ *H04L 27/2662* (2013.01)
USPC ....................................................... 370/210

(58) Field of Classification Search
None
See application file for complete search history.

(56) References Cited

U.S. PATENT DOCUMENTS

| | | | |
|---|---|---|---|
| 6,625,230 B1 * | 9/2003 | Bohm et al. ................... | 375/316 |
| 6,961,364 B1 * | 11/2005 | Laroia et al. ................... | 375/132 |
| 2009/0034407 A1 * | 2/2009 | Lindh ........................... | 370/210 |

FOREIGN PATENT DOCUMENTS
WO 97/36396 A1 10/1997

OTHER PUBLICATIONS

Ivan Perisa et al: "Code Acquisition in Direct Sequence Spread Spectrum Communication Systems Using an Approximate Fast Fourier Transform" Aug. 1, 2006, Spread Sprectrum Techniques and Applications; 2006 IEEE Ninth International Symposium on IEEE, PI, pp. 54-58, XP031047521, ISBN: 9780780397798—the whole document.

Spiilard C L et al: "A serial-parallel FFT correlator for PN code acquisition from LEO satellites" Spread Spectrum Techniques and Applications, 1998. Proceedings., 1998. IEEE 5th International Symposium on Sun City, South Africa Sep. 2-4, 1998, New York, NY USA, IEEE, US, vol. 2, Sep. 2, 1998; pp. 446-448, XP010307572 ISBN: 978-0-7803-4281-1—the whole document.

(Continued)

*Primary Examiner* — Ricky Ngo
*Assistant Examiner* — Phuongchau B Nguyen
(74) *Attorney, Agent, or Firm* — Michael A. Glenn; Glenn Patent Group

(57) ABSTRACT

An apparatus for estimating a frequency shift and a time shift in a CDMA signal based on a CDMA code associated with a CDMA signal, having a modulation removal stage for removing a data modulation from the CDMA signal to obtain a modified CDMA signal. The apparatus further has a frequency domain transformer for transforming the modified CDMA signal to the frequency domain to obtain a modified CDMA spectrum and a frequency shift detector for detecting a group of candidate frequency shifts based on the modified CDMA spectrum. The apparatus further has a processing stage for processing the CDMA signal and a candidate frequency shift to obtain the time shift, when a combination of the CDMA signal, the CDMA code and the candidate frequency shift fulfills an optimization criterion and for selecting the candidate frequency shift as the frequency shift.

14 Claims, 10 Drawing Sheets

OTHER PUBLICATIONS

Mao W-L et al: "New code delay compensation algorithm for weak GPS signal acquisition" AEU International Journal of Electronics and Communications, Elsevier, Jena, DE, vol. 63, No. 8, Dec. 1, 2008, pp. 665-677, XP026153595, ISSN: 1434-8411 (retrieved on Jul. 18, 2008)—the whole document.

Mao W L et al: "Design of Peak-finding Algorithm on Acquisition of Weak GPS Signals" Systems, Man and Cybernetics, 2006. ICSMC '06. IEEE International Conference on, IEEE, PI, Oct. 1, 2006, pp. 1820-1825, XP031117205 ISBN: 978-1-4244-0099-7, abstract; figures 1, 4.

Extended European Search Report mailed Mar. 10, 2010 in parallel European Patent Application EP09009939, 13 pages.

* cited by examiner

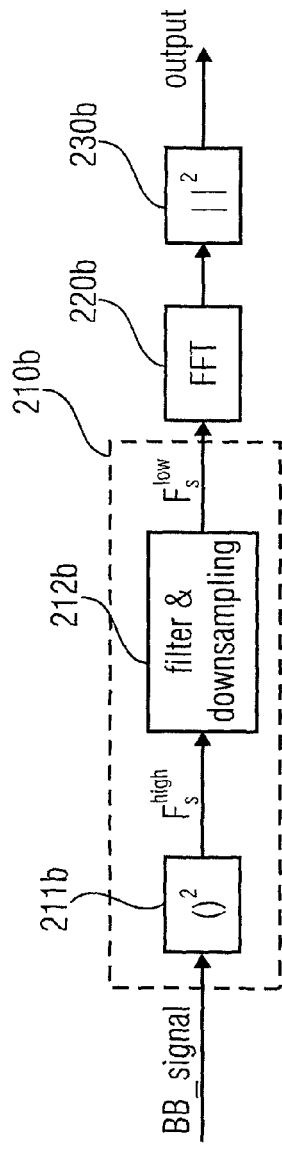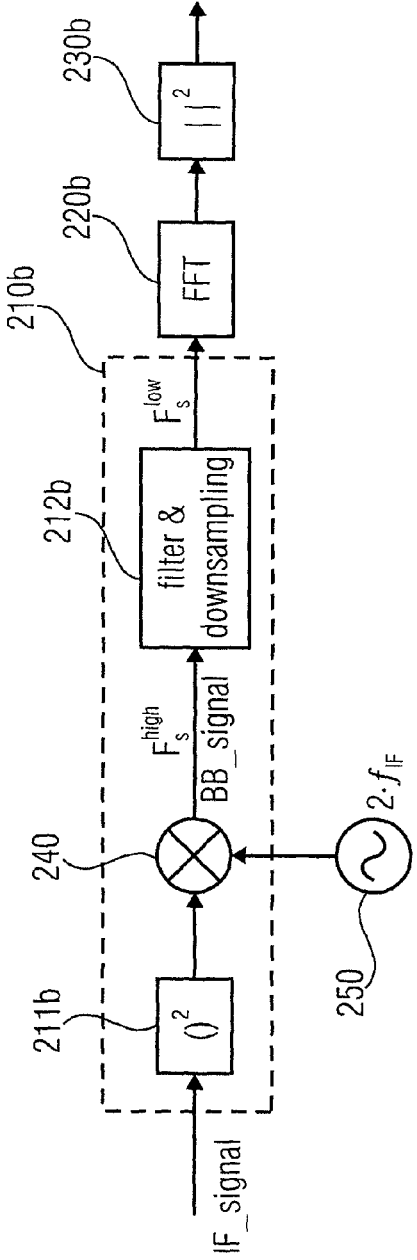
FIG 2D
FIG 2E

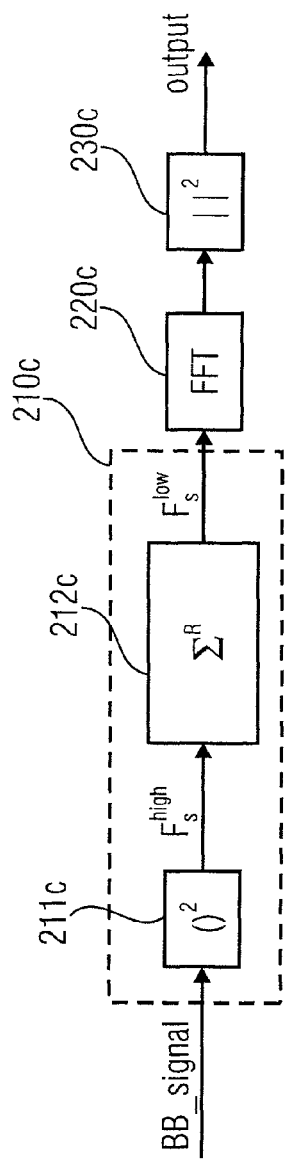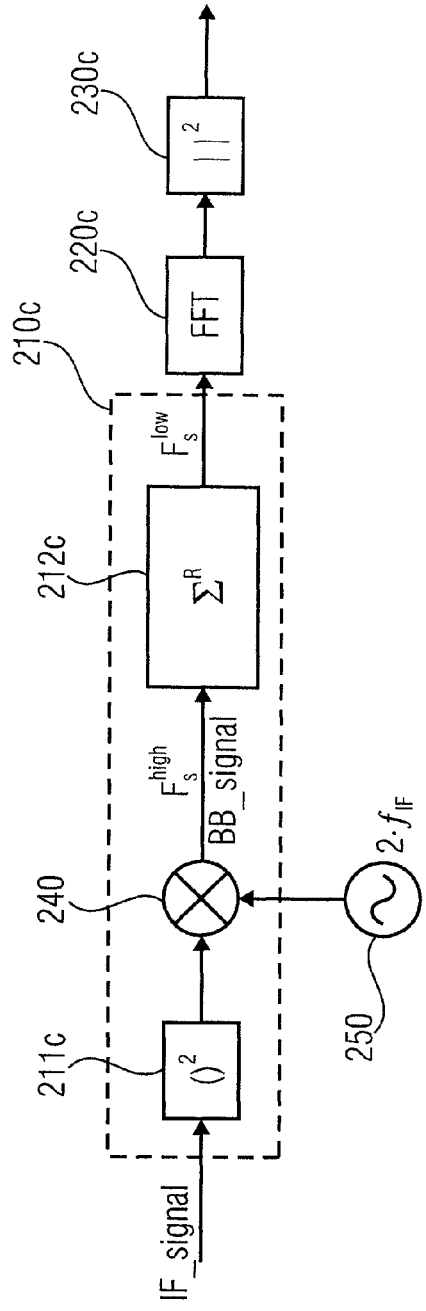

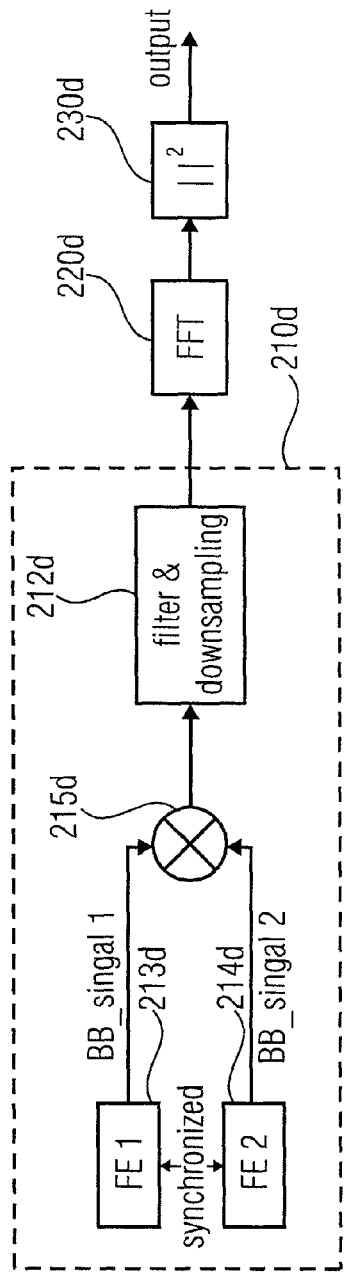
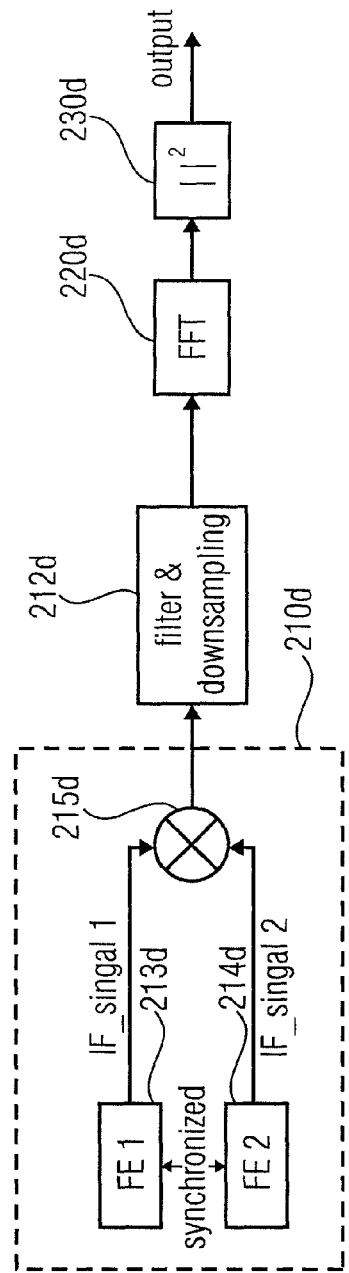
FIG 2H
FIG 2I (STATE OF THE ART)

(STATE OF THE ART)

(STATE OF THE ART)

(STATE OF THE ART)

(STATE OF THE ART)

APPARATUS AND METHOD FOR ESTIMATING A FREQUENCY SHIFT AND A TIME SHIFT

CROSS-REFERENCE TO RELATED APPLICATIONS

This application claims priority from German Patent Application No. 09009939.1-2411, which was filed on Jul. 31, 2009, and is incorporated herein in its entirety by reference.

BACKGROUND OF THE INVENTION

The present invention is in the field of frequency offset and time offset estimation, as for example, carried out for synchronization purposes in spread spectrum receivers.

As common in conventional receivers, synchronization to receive signals is needed in order to properly detect data. Especially systems with mobile transmitters or receivers, frequency offset estimation for Doppler frequency shift compensation purposes is also carried out. For example, in CDMA (Code Division Multiple Access) systems, a signal acquisition process is carried out. Particularly in GNSS (Global Navigation Satellite System) systems, receivers may have to synchronize in frequency and time to the received signals. This signal acquisition is carried out prior to identification of different transmitters, in mobile communication systems prior to separation of different users, spreading sequences or pseudo-random codes, of which signals may be comprised in the overall received signal. This can, for example, be done by correlation receivers or processors, which target to match an incoming code comprised in the received signal with a known code stored in the receiver.

A problem for such conventional systems arises, due to mobility of transmitters or receivers, reflectors respectively. These may evoke an unknown Doppler effect which may render the correlation process useless if the modulation or distortion, which is evoked by the Doppler frequency is not removed. Therefore, conventional systems may have to spend high efforts and processing powers, in order to determine the Doppler frequencies for Doppler frequency compensation or equalization.

Conventional systems may subdivide an acquisition process in a two-dimensional search. On the one hand, they may carry out a time search along the time axis, in order to achieve synchronization with the beginning of e.g. a PN-code (Pseudo-Noise). Moreover, on the other hand a frequency search along the frequency axis may be carried out, in order to enable Doppler frequency removal or, generally, compensation of frequency shifts.

The following equation defines a simplified base-band signal in order to illustrate this process, $$\text{BB\_signal}(t) = \sum_{i=1}^{N} A_i D_i(t - \tau_i) \cdot C_i(t - \tau_i) \cdot \exp(j2\pi f_D^i t) + n(t). \tag{1}$$

N represents the number of codes or transmitters present in the received signal, where one code or transmitter is indexed by i. $A_i$ corresponds to the amplitude of code or transmitter i. $C_i(t)$ represents a respective pseudo-random code. $D_i(t)$ represents the modulating data. $\tau_i$ and $f_D^i$ are the two parameters, the time shift and the frequency shift, that the acquisition process is seeking to determine for each of the transmitters, codes respectively. Noise is represented by n(t), for example, n(t) may correspond to additive white Gaussian noise (AWGN). Alternatively, the processing, which will be described in the following can be carried out in an intermediate frequency band. The according intermediate frequency signal can be defined as $$\text{IF\_signal}(t) = \sum_{i=1}^{N} A_i D_i(t - \tau_i) \cdot C_i(t - \tau_i) \cdot \exp(j2\pi (f_D^i + f_{IF})t) + n(t), \tag{1a}$$

wherein $f_{IF}$ defines the intermediate frequency.

In order to enable proper equalization or compensation the time shift and the frequency shift have to be determined with a certain accuracy. In conventional systems the accuracy needed for these values defines a certain step width within a possible range, which in turn is based on the system's characteristics and parameters.

As an example for a conventional system, GPS (Global Positioning System) will be illuminated in the following. For GPS the Doppler range is defined within −5 kHz and 5 kHz, i.e. a total bandwidth of 10 kHz, for a static user. Typically, this step width in which a frequency search is carried out is typically 500 Hz. The step width may be defined by the coherent integration time using for example $$f_{step} = \frac{2}{3 \cdot T^{coh}}, \tag{2}$$

wherein $f_{step}$ defines step width and $T^{coh}$ corresponds to the coherence time. More information about the integration time of acquisition algorithm, especially about long integration times, can, for example, be found in "Block Acquisition of Weak GPS signals in a Software Receiver" by Mark L. Psiaki.

In the following, the step width within the considered Doppler range will also be referred to as "Doppler bins". For the example of GPS the time search range is typically 1 ms, which also equals the duration of one pseudo-random code sequence. The precision within which synchronization may be carried out depends on the chip rate of the code, where a minimum precision is two samples per chip. In a GPS PN-code there are 1023 chips in the L1-band. Thus, the time search will have to be done with at least 2×1023=2046 steps, and typically 4×1023=4092 steps are used. In the following these steps will also be referred to as "code bins".

FIG. 5 illustrates a two-dimensional search plane. FIG. 5 shows a coordinate system in which the abscissa represents the time domain and the ordinate represents the frequency domain. The grid shown within the two-dimensional search plane or search space represents the number of Doppler bin and code bin combinations, which may be searched in a conventional GPS system. As an example, FIG. 5 shows N code bins and a Doppler frequency range of −5 kHz to 5 kHz. Moreover, in FIG. 5 it is assumed that the N code bins represent 1 ms.

When searching for the correlation value throughout the search plane depicted in FIG. 5, a signal can be detected when a correlation value in one of the depicted cells exceeds a certain noise threshold. FIG. 6 depicts correlation values over the two-dimensional search space or plane. The signal depicted in FIG. 6 is an example signal of correlation values from a received GPS signal. As can be seen from FIG. 6, the correlation peak can be easily distinguished.

In the following, some basic conventional acquisition methods will be described. Generally, detailed explanations of acquisition methods can be found in "A Software-Defined GPS and Galileo Receiver, A Single Frequency Approach" by Kai Bone, Dennis M. Akos, Nicolaj Bertelsen, Peter Rinder, Soren Holdt Jensen. One conventional method, is the so-called serial search acquisition. This method is often used in CDMA systems. It searches for the correlation peak within the two-dimensional space depicted in FIG. 6 cell by cell, i.e. all combinations of time shifts and frequency shifts are considered one after the other. The algorithm is further detailed by the block diagram shown in FIG. 7.

As shown in FIG. 7, multiplier 702 multiplies an incoming signal with a locally generated code, which is generated by the PRN (Pseudo-random Noise) code generator 704. The incoming signal may correspond to a CDMA signal. In other words, according to equation 1 as described above, the incoming signal may be a superposition of multiple code sequences. The locally generated PRN code corresponds to one single time shift. In other words, the PRN code generator 704 generates codes with different time shifts, more specifically, one code for which the acquisition is carried out is generated by the PRN code generator 704 over and over again, however, with different time shifts according to the above described code bins. For each of the time shifted versions of this code, another output will be produced by the multiplier 702.

The output of the multiplier 702 is input into two more multipliers 706 and 708, where the signal is multiplied with a locally generated carrier signal, its quadrature component, respectively. As can be seen in FIG. 7, the carrier signal is locally generated by local oscillator 710 and corresponds to one frequency bin or frequency shift. Its quadrature component is produced by the phase shifter 712 before being multiplied with the output of the multiplier 702. The results are the in-phase and quadrature components for one time shift and frequency shift combination, i.e. one combination of a code bin and a frequency bin. The two outputs of the multiplier 706 and 708 are then accumulated in the accumulators 714 and 716 before their respective powers are evaluated by the processing blocks 718 and 720. The power signals are then added by adder 722, resulting in the output signal for one frequency bin and code bin combination, i.e., referring to FIG. 6, for one correlation value for one cell.

According to the above description, the correlation peaks have to be searched on every cell, one by one, therefore, the number of combinations, which have to be considered is very high. This represents a main disadvantage of the serial method. In the following two more methods will be described, which at least partly parallelize the search in one of the dimensions, time or frequency, making use of a FFT (Fast Fourier Transformation) algorithm.

FIG. 8 illustrates a conventional method, which parallelizes the frequency domain search for the acquisition algorithm. FIG. 8 shows that the multiplier 802 multiplies the incoming signal with a locally generated version of the PRN code. The locally generated PRN code is generated by the PRN code generator 804. Again, the incoming signal is multiplied with the code representing a certain user or transmitter, where every single code bin, i.e. time shift, has to be considered. As soon as the incoming code happens to be aligned with the self-generated code, then a peak will be seen and a result of the FFT, which is carried out in block 806. The peak detection can be carried out by considering the power density indicated by the squared magnitudes within block 808. The peak at the output of the FFT shows a Doppler effect that a concrete user suffers, i.e. the frequency shift or frequency bin that is associated with the respective PRN code can be detected from the power density spectrum at the output of block 808, having a peak at the respective frequency shift.

Another conventional concept for a parallel code phase search acquisition is depicted in FIG. 9. This method parallelizes the time search. As can be seen from FIG. 9, there are two multipliers 902 and 904 for multiplying a locally generated carrier signal with the incoming signal. The carrier signal is generated by the local oscillator 906, where one copy of the locally generated carrier signal is phase-shifted by the phase shifter 908 in order to obtain the quadrature component. The resulting in-phase and quadrature components are then transformed to the frequency domain by the FFT depicted in block 910. It is to be noted that in this example the frequency Doppler bins, or frequency bins or frequency shifts, are searched in a serial manner, while, as will be explained in further detail in the following, the code bins are solved in parallel. In this example, a local PRN code generator 912 generates a local copy of the desired code. The desired code is then transformed to the frequency domain by the FFT 914, where additional processing evaluates the conjugate complex of the frequency transformed copy of the desired code in block 916. A multiplier 918 multiplies the output of the FFT 910 and the output of the conjugate complex block 916. The result will be a phase-shifted power density spectrum, where the phase-shift comes from the time shift of the incoming signal in the time domain. An inverse FFT block 920 will transform the results to the time domain. The phase shift in the frequency domain will result in a time shift in the time domain. By evaluating the power distribution of the time domain signal in block 922, a shifted peak can be determined, corresponding to the cross correlation function of the incoming signal and the respective locally generated desired code. From the shifted peak the time shift or code bin can be determined by threshold detection.

In other words, the FFT 914 allows for parallel search of the code bins. As the number of code bins may be much higher than the number of Doppler bins or frequency shift, the parallelization of the time search may be the fastest conventional method. Note, that this fact may not be true when long coherent integration times are performed, however, it may be fastest for proper SNR conditions. Low SNR conditions may need longer coherent integration times, for which the relations between a number of Doppler bins and the number of code bins may be different. However, two FFT operations, in FIG. 9 depicted as FFT 914 and IFFT (inverse FFT) 920 are utilized to reach the desired output. However, due to the number of code-phase bins, the length of these FFTs is larger than the parallel frequency space search acquisition. To some extent, there is a trade-off between complexity, i.e. the size of the FFTs, which are carried out and the number of iterations, which have to be carried out.

SUMMARY

According to an embodiment, an apparatus for estimating a frequency shift and a time shift in a CDMA signal based on a CDMA code associated with a CDMA signal may have a modulation removal stage for removing a data and CDMA code modulation from the CDMA signal to acquire a modified CDMA signal; a frequency domain transformer for transforming the modified CDMA signal to the frequency domain to acquire a modified CDMA spectrum; a frequency shift detector for detecting a group of candidate frequency shifts based on the modified CDMA spectrum; a processing stage for processing the CDMA signal and a candidate frequency shift to acquire the time shift, when a combination of the CDMA signal, the CDMA code and the candidate frequency shift fulfills an optimization criterion and for selecting the candidate frequency shift as the frequency shift.

According to another embodiment, a GPS receiver having an apparatus for estimating a frequency shift and a time shift in a CDMA signal based on a CDMA code associated with a CDMA signal may have a modulation removal stage for removing a data and CDMA code modulation from the CDMA signal to acquire a modified CDMA signal; a frequency domain transformer for transforming the modified CDMA signal to the frequency domain to acquire a modified CDMA spectrum; a frequency shift detector for detecting a group of candidate frequency shifts based on the modified CDMA spectrum; a processing stage for processing the CDMA signal and a candidate frequency shift to acquire the time shift, when a combination of the CDMA signal, the CDMA code and the candidate frequency shift fulfills an optimization criterion and for selecting the candidate frequency shift as the frequency shift.

According to another embodiment, a method for estimating a frequency shift and a time shift in a CDMA signal based on a CDMA code associated with the CDMA signal may have the steps of removing a data modulation from the CDMA signal to acquire a modified CDMA signal; transforming the modified CDMA signal to the frequency domain to acquire a modified CDMA spectrum; detecting a group of candidate frequency shifts based on the modified CDMA spectrum; processing the CDMA signal and a candidate frequency shift to acquire the time shift, when a combination of the CDMA signal, the CDMA code and the candidate frequency shift fulfills an optimization criterion and for selecting the candidate frequency shift as the frequency shift.

According to another embodiment, a computer program may have a program code for performing the method for estimating a frequency shift and a time shift in a CDMA signal based on a CDMA code associated with the CDMA signal which may have the steps of removing a data modulation from the CDMA signal to acquire a modified CDMA signal; transforming the modified CDMA signal to the frequency domain to acquire a modified CDMA spectrum; detecting a group of candidate frequency shifts based on the modified CDMA spectrum; processing the CDMA signal and a candidate frequency shift to acquire the time shift, when a combination of the CDMA signal, the CDMA code and the candidate frequency shift fulfills an optimization criterion and for selecting the candidate frequency shift as the frequency shift, when the computer program runs on a computer processor.

The present invention is based on the finding that the number of frequency bins to be searched for acquisition can be reduced, when the modulation effect of the codes can be removed from a CDMA signal. It is another finding of the present invention that the modulation influence of the data or code sequences of the CDMA signal can be removed, for example, by squaring the signal, or by multiplying the signal with a synchronized copy of the same signal.

In other words, a CDMA sequence may be composed by a sequence of +1, −1, +j, −j. By squaring the signal or multiplying the signal with an independent copy thereof, all the different values of the code sequence may be converted to +1 in either the in-phase or quadrature component, which can be done in the base-band and in the intermediate-band. The squaring operation may be carried out on a complex or real signal, on real and imaginary parts separately or together, and in some embodiments the squaring operation may be carried out twice. There are multiple options for the squaring operation, which may, according to one finding of the present invention, be used for removing the modulation evoked by data and CDMA code from a CDMA signal. Therewith, a frequency offset if present, remains in the signal modulated with 1, but multiplied by 2, when squared twice multiplied by 4, respectively. From this signal possible Doppler frequencies may be determined. The possible Doppler frequencies may establish candidate frequency shifts and may be used to carry out a reduced search for the correct frequency bin or candidate frequency shift within the received CDMA signal, in the first place.

It is one finding of the present invention that a two-step acquisition can be carried out more efficiently, resulting in a quicker acquisition and a less complex search. Once candidate frequency shifts or frequency bins have been determined, search for the time shift or code bin can be parallelized for each of the candidate frequency bins. Therewith, embodiments of the present invention provide the advantage that signal acquisition, in terms of finding the correct time and frequency shift can be carried out quicker, in a less complex way respectively.

BRIEF DESCRIPTION OF THE DRAWINGS

The embodiments of the present invention will be detailed using the accompanying figures, in which

FIGS. 2a-2i illustrate different embodiments for determining candidate frequency shifts;

DETAILED DESCRIPTION OF THE INVENTION

In the following, embodiments of the present invention will be described using the illustrations of the figures. It is to be understood that these are only possible embodiments and are not to be interpreted as limiting the invention to the details of said embodiments.

Figure 1:
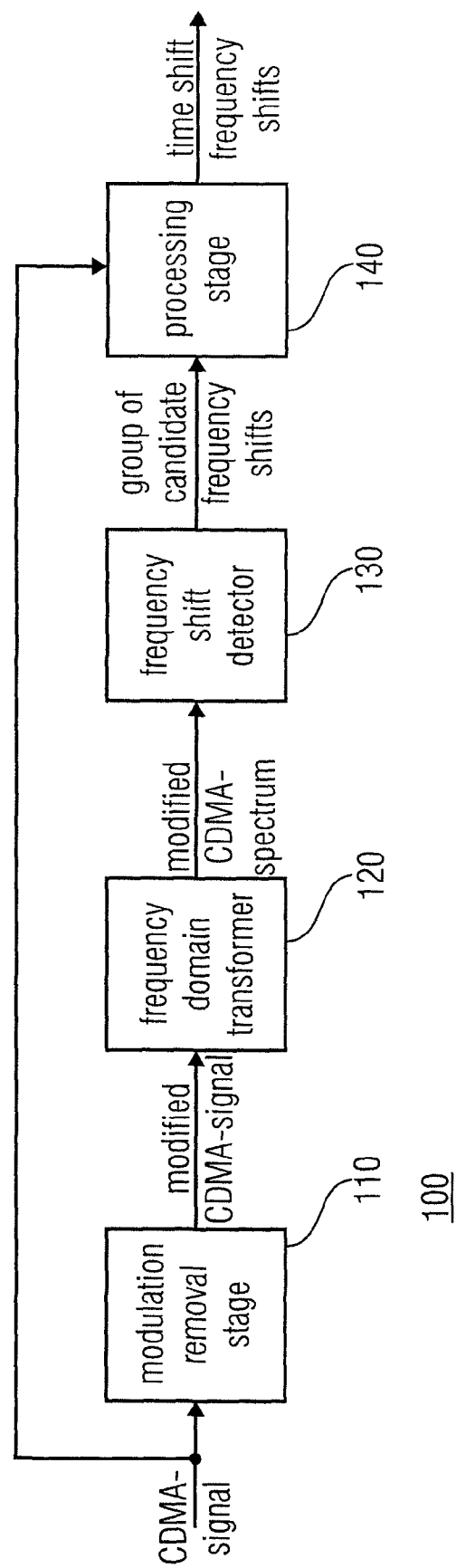
FIG. 1 shows an embodiment of an apparatus for estimating a frequency shift and a time shift.

FIG. 1 shows an embodiment of an apparatus 100 for estimating a frequency shift and a time shift in a CDMA signal based on a CDMA code associated with the CDMA signal. A CDMA signal is a signal, which is composed of one or multiple code sequences, which are also called spreading sequences. The CDMA signal may be interpreted as a base-band signal according to the above equation 1 or as an intermediate frequency signal according to the above equation 1a. Generally, a CDMA signal is, for example, provided by a GPS satellite, where a satellite can be identified by a unique code sequence, which is used for transmitting information bits from the satellite to the receiver. In some embodiments the CDMA signal corresponds to a base-band version of a received signal, in other embodiments the CDMA signal may correspond to an intermediate-band version of a received signal. In embodiments, an information bit may be multiplied with a code sequence, where the code sequence is comprised of chips, and wherein the duration of a chip is shorter than the duration of a bit. In other words, the chip rate is higher than the bit rate. In other embodiments, as for example, receivers for GPS, twenty code sequences of 1023 chips may be used for transmission of each information bit. In embodiments, the CDMA signal can be associated with a CDMA code or spreading sequence, i.e. at least one CDMA code or sequence is present in the signal. Generally, such a CDMA signal may be received in a receiving stage, down-converted from the transmission band to the base-band or intermediate-band, for example, by means of modulation or mixing, resulting in a base-band or intermediate-band version of the CDMA signal. The base-band or intermediate-band version of the CDMA signal may be superimposed by noise, for example by AWGN (Additive White Gaussian Noise). For the following description of the embodiment depicted in FIG. 1, it is assumed that the CDMA signal is composed of at least one CDMA code in the base-band, in the intermediate-band respectively.

According to FIG. 1, the apparatus 100 comprises a modulation removal stage 110 for removing a data and code modulation from the CDMA signal to obtain a modified CDMA signal. In other words, as already described above, the CDMA signal may be shifted in the frequency domain, i.e. a Doppler frequency offset or shift may be present in the base-band signal, the intermediate frequency band respectively. The frequency shift or offset may be due to motion or mobility of the respective transmitter or receiver. Frequency offsets may also be evoked by non-perfect generation of transmission band frequencies by local oscillators in receivers. Frequency shifts within a CDMA base-band or intermediate-band signal may be evoked by multiple causes. In the embodiment it is assumed that the CDMA signal is shifted in the frequency domain by a frequency shift. In other words, the CDMA signal does not perfectly match the transmitted base-band or intermediate-band signal, but only with a certain accuracy, where the difference between the perfect match and the real conversion can be defined by said frequency shift and other distortions as well as AWGN.

The CDMA signal may be composed of the CDMA code, noise, and another distortion evoked by the frequency shift. The modulation removal stage 110 is adapted for removing a data modulation from the CDMA signal, i.e. the influence of the CDMA code and data. It is to be noted that generally the CDMA signal may be composed of a plurality of CDMA codes or CDMA sequences, cf. equations 1 and 1a. The modulation removal stage 110 is adapted for obtaining a modified CDMA signal, in which the influence of the CDMA code or the plurality of the CDMA codes and data is suppressed. In embodiments, which are to be detailed subsequently, this can, for example, be achieved by squaring the signal or by multiplying the signal with a synchronized copy of the signal.

The modified CDMA signal therefore differs from the CDMA signal in that the data and code modulation is removed, i.e. ideally, there is only noise and the distortion evoked by the frequency shift.

The embodiment of the apparatus 100 as depicted in FIG. 1 further comprises a frequency domain transformer 120 for transforming the modified CDMA signal to the frequency domain to obtain a modified CDMA spectrum. In other words, the modified CDMA signal is transformed to the frequency domain, which can in embodiments, for example, be realized by means of Fast Fourier Transformation (FFT), MDCT (Modified Discrete Cosine Transform), DCT, etc. Embodiments shall not be limited to any specific frequency transformation algorithm, however, the frequency domain transformer 120 is adapted for obtaining a modified CDMA spectrum for further signal processing.

According to FIG. 1, the apparatus 100 further comprises a frequency shift detector 130 for detecting a group of candidate frequency shifts based on the modified CDMA spectrum. In other words, the modified CDMA spectrum is based on the modified CDMA signal. Therefore, the modified CDMA spectrum comprises components evoked by noise and the distortion evoked by the frequency shift. In embodiments the frequency shift detector 130 may detect the candidate frequency shifts by means of a threshold detection. In other words, in the spectrum of the CDMA signal from which the influence of the actual CDMA codes was removed, frequency shifts may be detected. It is to be noted that for each CDMA code or spreading sequence a different frequency shift may apply, according to different transmitters or users and their relative motions or offsets, etc. In embodiments in which only one CDMA-code is comprised in the CDMA signal, only a single candidate frequency shift may be detected.

Moreover, the embodiment of the apparatus 100 comprises a processing stage 140 for processing the CDMA signal and the candidate frequency shifts to obtain the time shift, when a combination of the CDMA signal, the CDMA code and the candidate frequency shift fulfills an optimization criterion and for selecting the candidate frequency shift as the frequency shift.

In embodiments the processing stage 140 can be adapted such that the processing comprises demodulating the CDMA signal based on the candidate frequency shift from the group of candidate shifts to obtain a demodulated candidate CDMA signal associated with the candidate frequency shift. In other words, as it was described above, a number of possible frequency shifts, the so-called candidate frequency shifts have been detected. In embodiments, the processing stage 140 can be adapted for removing the influence of said candidate frequency shifts from the CDMA signal, for example by means of demodulating the CDMA signal or by mixing the CDMA signal with an according signal generated by a local oscillator. Thus, the results will be referred to in the following as a demodulated candidate CDMA signal.

The processing stage 140 may be further adapted for transforming the demodulated candidate CDMA signal to the frequency domain to obtain a candidate CDMA spectrum. Again, in the embodiment it is not important which kind of transformation is applied to the candidate's CDMA signal, some examples are FFT, DFT, DCT, MDCT, etc.

Furthermore, the processing stage 140 can be adapted for transforming a combination of the candidate CDMA spectrum and a frequency transformed version of the CDMA code to the time domain to obtain a combined candidate CDMA signal. In other words, once the candidate CDMA spectrum is obtained, it can be combined in the frequency domain with a frequency transformed version of the CDMA code. As already mentioned above, there are multiple possibilities on how to obtain the frequency transformed version of the CDMA code, of which some examples are again FFT, DFT, DCT, MDCT, etc. The combination may, for example, be carried out by means of multiplication of the two spectra, wherein the conjugate complex may be taken from either one of the spectra. In one embodiment the CDMA code corresponds to a signal from a certain satellite or user or transmitter, for which acquisition should be obtained. Therefore, the frequency transformed version of this specific CDMA code may be determined and the complex conjugate thereof. The complex conjugate may then be multiplied with the candidate CDMA spectrum. The result of this operation may then be transformed to the time domain.

The processing stage 140 may then be further adapted for detecting the time shift based on the combined candidate CDMA signal when the combined candidate CDMA signal fulfills an optimization criterion, and for selecting the candidate frequency shift associated with the demodulated candidate CDMA signal as the frequency shift. In other words, in the time domain, where the transformation from the frequency domain to the time domain may be carried out by means of another transformation, as for example inverse FFT, inverse DFT, inverse DCT, inverse MDCT, etc., in embodiments a threshold detection may be carried out.

Multiplication in the frequency domain corresponds to convolution in the time domain. The result in the time domain therewith represents a correlation between the CDMA code, and the demodulated candidate CDMA signal, i.e. the CDMA signal from which the influence of a certain candidate frequency shift was removed. By evaluating the squared magnitudes of the signal in the time domain, in some embodiments simple threshold detection may be carried out, i.e. a threshold may be defined as optimization criterion, the respective time shift may be found. If the accordingly obtained combined candidate CDMA signal exceeds that threshold, i.e. it comprises a peak, the time shift can be detected by the time shift of the peak. In other words, a code phase search for acquisition purposes may be carried out in a parallelized manner. Moreover, since the peak is obtained for a certain candidate frequency shift, which was applied to the CDMA signal to obtain the demodulated candidate CDMA signal, said particular frequency shift corresponds to the frequency shift, which is to be estimated.

Figure 5:
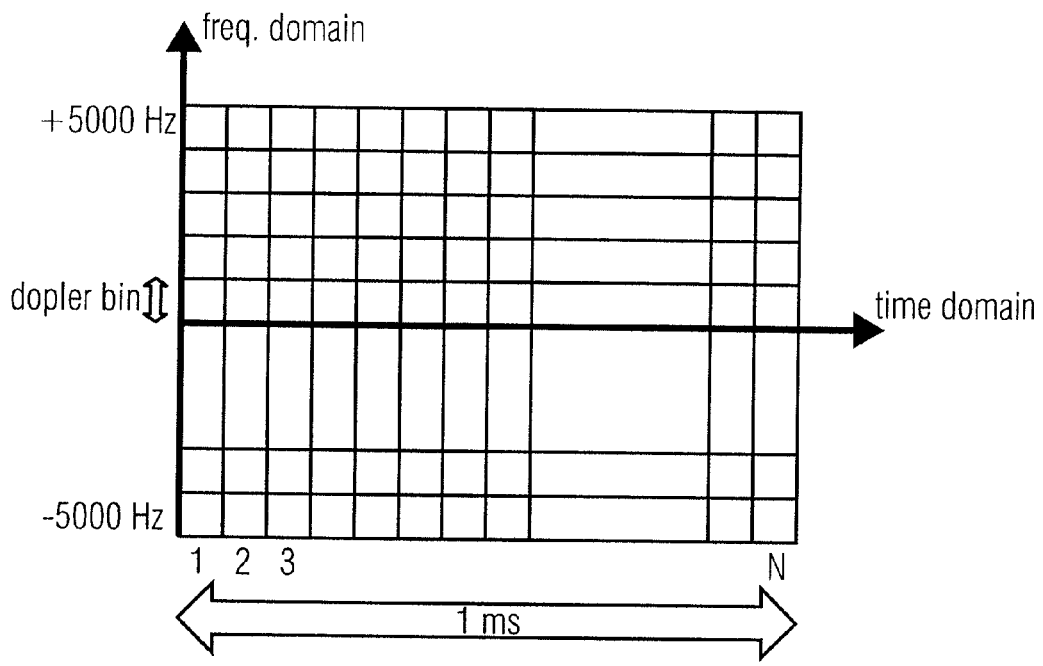
FIG. 5 illustrates a state-of-the-art search plane or a space.

In the following another embodiment will be described, in which the processing stage 140 carries out a different processing. In this embodiment the processing stage 140 can be adapted such that the processing comprises combining the CDMA signal and the CDMA code based on a candidate time shift to obtain a candidate decoded CDMA signal. In other words, in this embodiment, the search for the time shift is carried out per time shift candidate. Therefore a time shift can be selected as candidate time shift and combined, e.g. multiplied, with the CDMA signal. The result of this operation is referred to as the candidate decoded CDMA signal. There may be as many candidate decoded CDMA signals as there are time shifts, cf. FIGS. 5 and 6.

Figure 6:
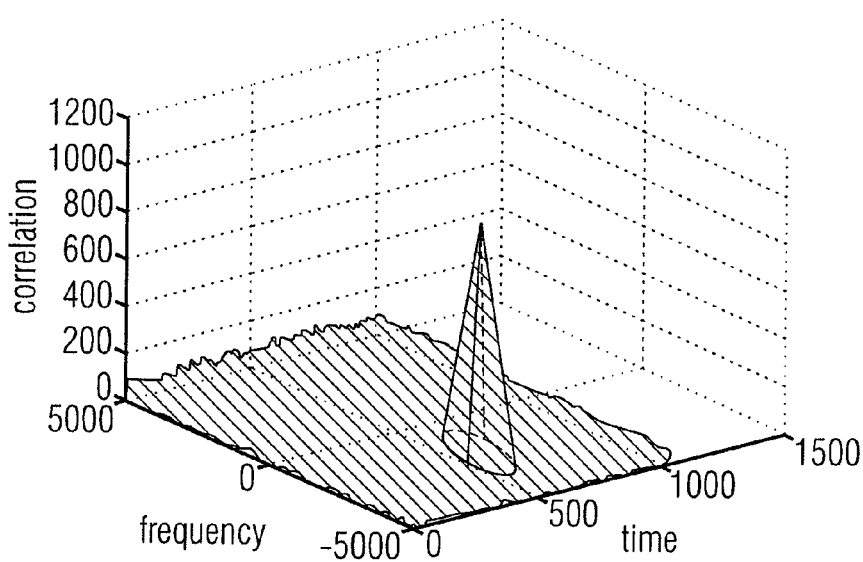
FIG. 6 illustrates correlation values across a search plane or a space.

The processing stage 140 may then be further adapted such that the processing further comprises demodulating the candidate decoded CDMA signal based on the candidate frequency shift from the group of candidate frequency shifts to obtain a demodulated candidate decoded CDMA signal. In other words, the candidate decoded CDMA signal may then be demodulated based on a candidate frequency shift, the result is also referred to as the demodulated candidate decoded CDMA signal. Furthermore, the processing stage may then be adapted for further accumulating the demodulated candidate decoded CDMA signal to obtain an accumulated candidate CDMA signal. In other words the samples of the demodulated candidate decoded CDMA signal may be accumulated or added, the result is also referred to as the accumulated CDMA signal. In this embodiment the accumulated CDMA signal may correspond to a result of a correlation between the CDMA signal and the CDMA code for a combination of a candidate time shift and a candidate frequency shift. Good correlation may not be obtained for either of a wrong candidate time or frequency shift, which is illustrated in FIG. 6.

The processing stage 140 can be adapted for detecting the time shift based on the accumulated candidate CDMA signal when the accumulated candidate CDMA signal fulfills an optimization criterion and for selecting the candidate frequency shift associated with the demodulated candidate decoded CDMA signal as the frequency shift. In other words, if the result of the correlation of the CDMA signal and the CDMA code for a certain combination of a candidate time shift and a candidate frequency shift exceeds a threshold, the candidate time shift may be selected as the time shift and the candidate frequency shift may be selected as the frequency shift. Basically, this embodiment provides the advantage that less combinations of time an frequency shifts have to be evaluated as the group of candidate frequency shifts comprises less candidate frequency shifts as there are in the full range of potentially possible frequency shifts, cf. FIGS. 5 and 6.

Embodiments of the present invention therewith provide the advantage that the search for the frequency shifts can be narrowed down as compared to conventional concepts. By carrying out the above-described signal processing, a group of candidate frequency shifts may be obtained in embodiments, for example, corresponding to the number of different CDMA codes present in the CDMA signal. The group of candidate frequency shifts comprises less frequency shifts than the overall possible frequency shifts, cf. FIG. 5. In conventional concepts, as it was detailed above, the search in the frequency domain spans across the entire frequency shift range, where in embodiments, only a number of frequency shifts, which is less than the total number of frequency shifts in the frequency shift range, has to be evaluated.

In embodiments, the apparatus 100 may further comprise a controller for controlling the processing stage 140 such that candidate frequency shifts from the group of candidate frequency shifts are processed and the time shift is detected. In other words, a controller may control the processing stage in order to find a candidate frequency shift, for which the time shift can be detected. As it was already explained with respect to FIG. 6, there are candidate frequency shifts, for which the optimization criterion, for example, by means of a threshold detection may not be fulfilled. The controller may be adapted for controlling the processing stage 140 in a way that, for example, all candidate frequency shifts are processed in order to find the respective correlation peak, i.e. in order to fulfill the optimization criterion for at least one candidate frequency. In embodiments the controller can be adapted for controlling the processing stage 140 in an iterative sequence such that the candidate frequency shifts from the group of frequency shifts are iterated until the time shift is detected. In other words, a serial search may be carried out through the candidate frequency shifts from the group of candidate frequency shifts.

In other embodiments, the controller can be adapted for controlling the processing stage 140 in a parallel manner such that all frequency shifts from the group of frequency shifts are processed in parallel, and the optimization criterion may then be chosen in a way that the maximum peak of all combined candidate CDMA signals may be evaluated.

Figure 8:
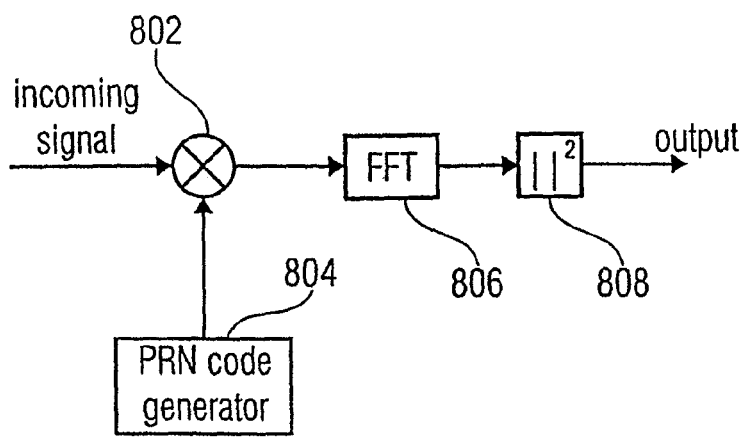
FIG. 8 illustrates a state-of-the-art acquisition search with parallelization of the search for the frequency bin.

In the following, embodiments of the modulation removal stage 110 will be detailed. In embodiments, a modified concept which has been described with respect to FIG. 8 may be used in order to determine the Doppler frequencies. It is to be noted that in the following the determination of the Doppler frequency can be understood as the determination of any frequency offset present in the signal. The incoming signal, i.e. the CDMA signal, may comprise a frequency offset, for example, a Doppler frequency. In embodiments, the apparatus 100 for estimating the frequency shift and the time shift may determine the group of candidate frequency shifts prior to further signal processing.

Embodiments may therewith provide the advantage, that by determination of the frequency offsets prior to further processing, the number of users or transmitters or codes present in the incoming signal and the frequency offsets are known in advance. This enables reduction of the complexity and extent of the subsequent signal processing. Therefore, in an embodiment of the apparatus 100, the code indices i and the code synchronization process may be ignored, since the first task is to determine the group of candidate frequency shifts. Later on, when the specific search for the CDMA code and its time shift are performed, the number of possible frequency shifts to be considered has already been reduced, resulting in the above-described advantages.

Figure 2A:
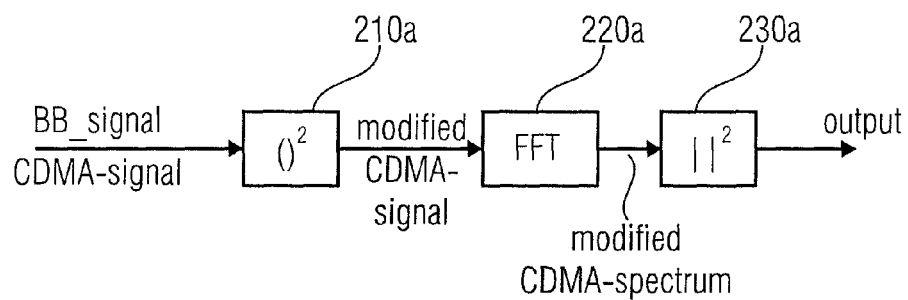

FIGS. 2a to 2i illustrate different embodiments of the modulation removal stage 110, the frequency domain transformer 120, and the frequency shift detector 130. FIG. 2a shows a block diagram with an embodiment of the modulation removal stage 210a, an embodiment of the frequency domain transformer 220a and an embodiment of the frequency shift detector 230a. The CDMA signal is also termed BB_signal, to indicate that a base-band (BB) signal is assumed, cf. equation 1. In FIG. 2a the embodiment of the modulation removal stage 210a is implemented as a square operation on the incoming signal. Squaring the incoming signal can wipe out all existing codes and data modulations and the remaining carriers will have a frequency, which will be the double of the real Doppler frequencies or frequency shifts of the incoming signal. In other words, the incoming base-band CDMA signal is a composition of multiple spreading sequences, wherein one spreading sequence is composed of a sequence of +1, −1, +j, −j. Squaring the signal will convert all −1 to 1, −j to j, respectively. Therewith, the influence of the actual superposition of the CDMA codes is removed from the signal. Due to this effect, the following embodiment of the frequency domain transformer 220a, which is exemplified as an FFT in FIG. 2a, can transform the modified CDMA signal to the frequency domain to obtain a modified CDMA spectrum. In the embodiment shown in FIG. 2a the frequency shift detector 230a is adapted for evaluating the power density spectrum in order to determine the group of candidate frequency shifts.

In embodiments there are several options for carrying out the squaring operation on the CDMA signal, some of which are to be detailed in the following assuming a base-band CDMA signal. All considerations equally apply to an intermediate-band CDMA signal. In a first embodiment a real CDMA code CA(t) or spreading sequence is assumed being composed of a PRN code of {−1,1}. The CDMA signal can then be described as $$\text{CDMA\_Signal} = A \cdot CA(t) \cdot \exp(j \cdot (\omega_D \cdot t + \phi)),$$

wherein A corresponds to the amplitude, CA(t) corresponds to the CDMA code, $\omega_D = 2\pi f_D$ corresponds to the circular Doppler shift and $\phi$ corresponds to an arbitrary phase shift. When the signal is squared, it simply follows $$\text{CDMA\_Signal}^2 = A^2 \cdot CA(t)^2 \cdot \exp(2j \cdot (\omega_D \cdot t + \phi)),$$

where it can be seen that the influence of the CDMA code is removed as $CA(t)^2 = 1 \forall t$. Therewith, the spectrum of the CDMA signal will have components at the double Doppler frequency only, where positive and negative Doppler frequencies can be distinguished. In another embodiment, the real and imaginary parts of the CDMA signal may be squared separately and combined. E.g. the difference may be evaluated, thus, $$Re\{\text{CDMA\_Signal}\}^2 - Im\{\text{CDMA\_Signal}\}^2 = A^2 \cdot \cos(2 \cdot \omega_D \cdot t + 2\phi).$$

It can be seen that the spectrum of the combination will also have components at the double Doppler frequency, however, positive and negative Doppler shifts may overlap. Generally there can be many different combinations, which may be used for determining a modulation removed signal, being dependent on the Doppler shift or a multiple thereof. In other embodiments complex CDMA codes $CA_1(t)+jCA_2(t)$ may be used, where $CA_1(t)$ corresponds to a PRN code in the real part and $CA_2(t)$ corresponds to a PRN code in the imaginary part. Both PRN code are composed of elements {−1,1}. In these embodiments the CDMA signal may be described as $$\text{CDMA\_Signal} = A \cdot (CA_1(t) + j \cdot CA_2(t)) \cdot \exp(j \cdot (\omega_D \cdot t + \phi)).$$

In this embodiment, squaring yields $$\begin{aligned}\text{CDMA\_Signal}^2 &= A^2 \cdot (CA_1(t) + j \cdot CA_2(t))^2 \cdot \exp(j \cdot 2(\omega_D \cdot t + \varphi)) \\ &= A^2 \cdot (CA_1(t)^2 + 2j \cdot CA_1(t)CA_2(t) - CA_2(t)^2) \cdot \\ &\quad \exp(j \cdot 2(\omega_D \cdot t + \varphi)) \\ &= A^2 \cdot 2j \cdot CA_1(t)CA_2(t) \cdot \exp(j \cdot 2(\omega_D \cdot t + \varphi)),\end{aligned}$$

where it was used that $CA_1(t)^2 = CA_2(t)^2 = 1 \forall t$. As it can be seen, the code modulation is not entirely removed as $CA_1(t)CA_2(t) \in \{-1,1\}$, thus, in this embodiment another squaring may be used yielding $$\text{CDMA\_Signal}^4 = -A^4 \cdot 4 \cdot CA_1(t)^2 CA_2(t)^2 \cdot \exp(j \cdot 4(\omega_D \cdot t + \phi)),$$

wherein $CA_1(t)^2 CA_2(t)^2 = 1 \forall t$ and thus data and code modulation is removed. It is to be noted that now in the respective spectrum it has to considered that the Doppler shift has been multiplied by 4. Moreover, as it can be seen, the positive and negative Doppler shifts can be distinguished. Other embodiments may make use of a combination of the real and imaginary parts. For example, the squared difference between the squared real and imaginary parts may be evaluated, thus, $$[Im\{\text{CDMA\_Signal}\}^2 - Re\{\text{CDMA\_Signal}\}^2]^2 = 2A^4 \cdot (1 - \cos(4 \cdot \omega_D \cdot t + 4\phi)).$$

In this embodiment, the spectrum may provide the Doppler shifts multiplied by a factor of 4. The above expression is real and therefore positive and negative Doppler shifts may overlap. Furthermore, it can be seen from the above expression that there is a DC offset, i.e. a component for $\omega_D = 0$, which may be compensated in embodiments for determination of actual zero-Doppler shifts in the CDMA signal.

Figure 2B:
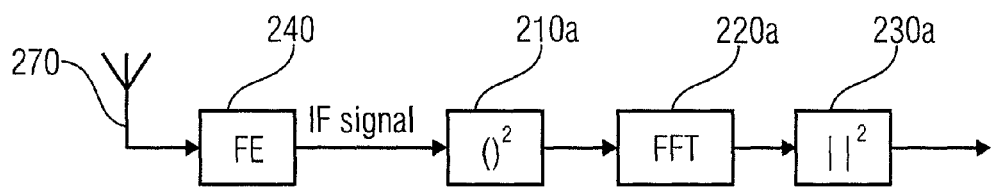

A similar signal processing can be carried out in the intermediate-band, which is illustrated in FIG. 2b. FIG. 2b shows similar components as FIG. 2a and additionally a front end (FE) stage 260 with a receive antenna 270. The front end stage 270 receives a receive signal from the receive antenna 270 and converts it to the intermediate-band, where an intermediate frequency signal termed IF_signal in FIG. 2b is obtained. The following processing in the embodiment of the modulation removal stage 210a, the embodiment of the frequency domain transformer 220a and the embodiment of the frequency shift detector 230a can be carried out in the intermediate-band in a similar manner as in the base-band as described above. The frequency shift detector 230a can be adapted for evaluating the power density spectrum in order to determine the group of candidate frequency shifts in the intermediate-band.

Figure 2C:
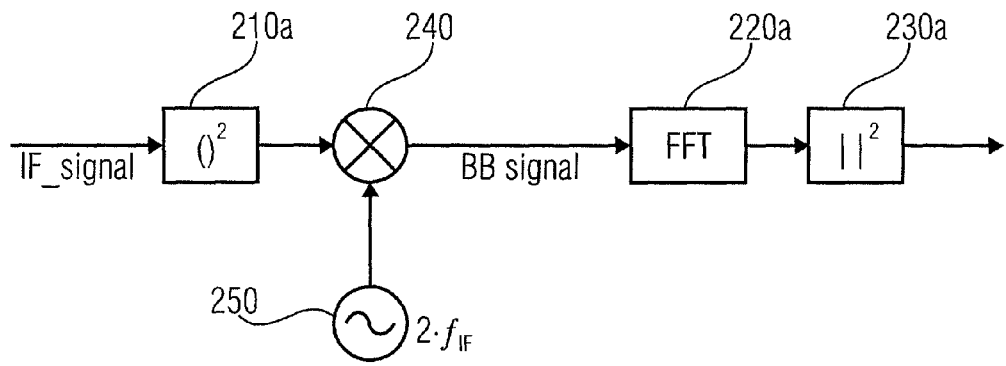

Another embodiment is depicted in FIG. 2c, in which a mixing stage 240, e.g. a multiplier, being connected to a local oscillator 250, is implemented between the modulation removal stage 210a and the frequency domain transformer

220a. The local oscillator 250 may provide a signal according to the double intermediate frequency $f_{IF}$. The reason for using 2 $f_{IF}$ is that the squaring operation 211b doubles the CDMA signal's frequency. In this embodiment the output of the modulation removal stage 210a is down-converted from the intermediate-band to the base-band. In other words embodiments of the apparatus 100 may comprise a mixing stage 140 for converting the modified CDMA signal from the intermediate-band to the base-band such that an intermediate-band version of the modified CDMA signal is output by the modulation removal stage 110 and a base-band version of the modified CDMA signal is input into the frequency domain transformer 120.

Figure 3:
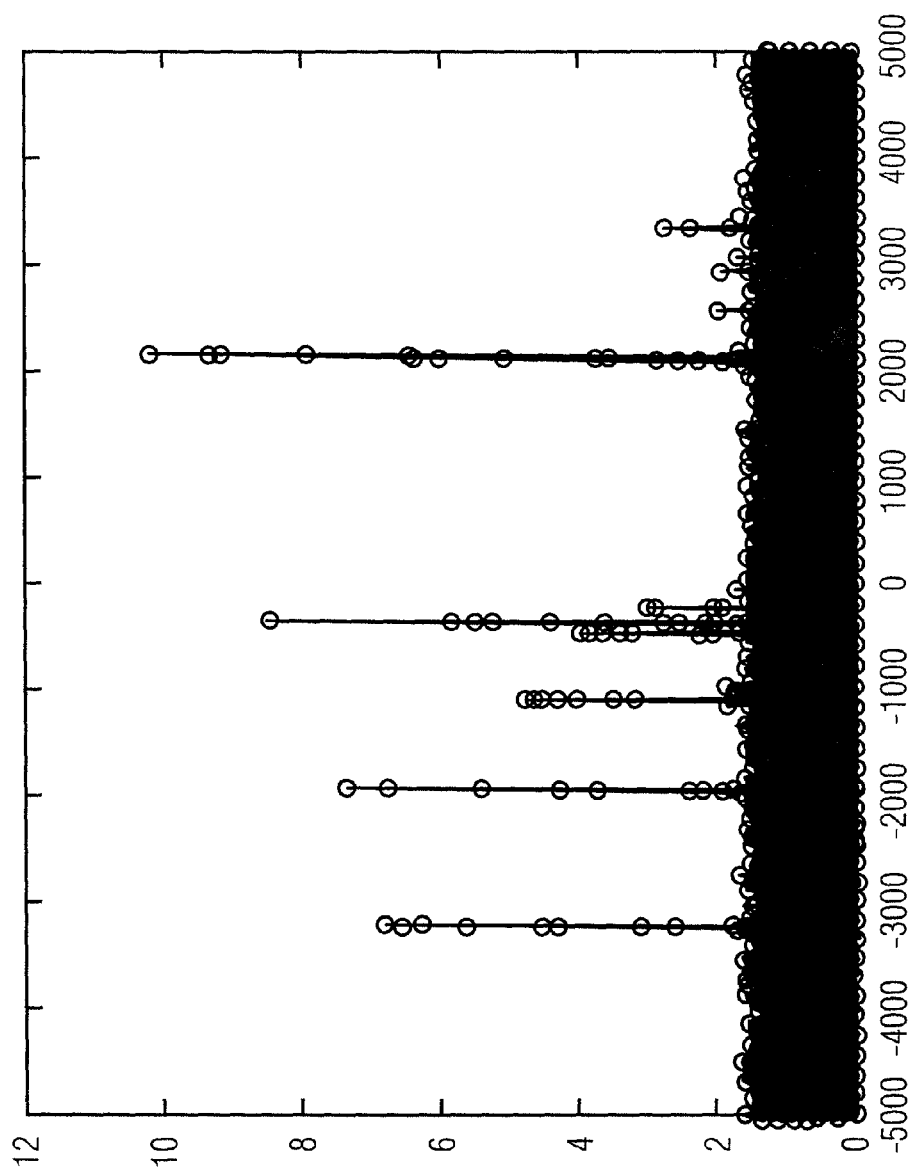
FIG. 3 illustrates a modified CDMA spectrum obtained in one embodiment.

FIG. 3 illustrates an example of a power density spectrum. In FIG. 3 a view chart is shown having frequency shifts on the abscissa and power density on the ordinate. From FIG. 3 it can clearly be seen that significant spectral power contributions occur at the respective frequency shifts.

As the BB_signal's or IF_signal's sampling rate, i.e. the CDMA signal's sampling rate, might be much higher than the one needed for the Doppler range detection, i.e. the evaluation of the candidate frequency shifts, embodiments of the modulation removal stage 210 may comprise a downsampling or filtering module, as it is exemplified in the embodiment shown in FIG. 2d. In FIG. 2d the embodiment of the modulation removal stage 210b comprises a squaring operation 211b and a filter and downsampling stage 212b. The squaring operation 211b is similar to the squaring operation carried out in FIG. 2a. The output of the squaring operation 211b still has the high sampling rate $F^{high}_s$, which is converted to the sampling rate $F^{low}_s$ by the filter and downsampling stage 212b. FIG. 2e depicts another embodiment, in which the CDMA signal corresponds to an intermediate frequency signal. In FIG. 2e the modulation removal stage 210b further comprises the mixer 240, which is connected to the local oscillator 250 operating at 2 $f_{IF}$. The output of the squaring operation 211b is down-converted from the intermediate-band to the base-band, the base-band signal is then provided to the filter and downsampling stage 212b. The following processing corresponds to the processing in the embodiment described with the help of FIG. 2d.

It is to be noted that the sampling frequency after the squaring operation 211b is much higher than the Nyquist frequency needed. Therewith, the filter and the downsampling stage 212b can downsample the signal, which allows reduction of the length of the following frequency transformation 220b, which is again implemented as an FFT in FIGS. 2d and 2e. The power evaluation in the embodiment of the frequency shift detector 230b is similar to the one described above for 230a in FIGS. 2a, 2b and 2c. For some CDMA systems, in embodiments the downsampling factor may be very large, which may make the implementation of a narrow filter more difficult. For instance, in a GNSS receiver, a sampling rate of about 16 MHz can be considered as typical. However, in order to observe frequencies within 2×(−5 kHz, 5 kHz), note that the factor 2 comes from the squaring effect, a sampling rate of 20 kHz is necessitated, according to the Nyquist frequency. A downsampling factor of $$R = \frac{F^{high}_s}{F^{low}_s} = \frac{16 \text{ MHz}}{20 \text{ kHz}} = 800 \qquad (3)$$

may result. Generally, downsampling processes may utilize filters, which tend to be large if such large downsampling factors as given in FIG. 3 are needed. For example, FIR (Finite Impulse Response) filters would have to be implemented having large memories. Therefore, as an embodiment of the filter and downsampling stage 212b a simplified approach is proposed. As a simple mean value filter can easily be implemented, the input samples with the rate of $F^{high}_s$ can be accumulated and then output at R rate. Such an embodiment is depicted in FIG. 2f.

FIG. 2f shows within the modulation removal stage 210c the same squaring operation 211c as it was already described in FIGS. 2a to 2e. The filter and downsampling stage 212c is implemented as an accumulator, accumulating R-samples of the input at the sampling rate of $F^{high}_s$ and outputting the accumulated values at the sampling rate of $F^{low}_s$. Moreover, the length, i.e. the number of samples within the BB_signal used for the approach depicted in FIG. 2f, can be determined by the respective designer or chosen flexibly dependent on the respective implementation. The longer the BB_signal, the more samples it comprises, the larger the FFT will be, but on the other side, detection can be approved, since the SNR (signal-to-noise-ratio) improves with an increasing length of the CDMA signal, i.e. with an increased number of samples in the CDMA signal. Therewith, the Doppler precision or the precision with which the frequency shifts or candidate frequency shifts can be determined, increases as well.

FIG. 2g depicts a corresponding embodiment for the intermediate-band, in which the CDMA signal corresponds to an intermediate frequency signal. In FIG. 2g the modulation removal stage 210c further comprises the mixer 240, which is connected to the local oscillator 250 operating at 2 $f_{IF}$. The output of the squaring operation 211c is down-converted from the intermediate-band to the base-band, the base-band signal is then provided to the filter and downsampling stage 212c. The following processing corresponds to the processing in the embodiment described with the help of FIG. 2f.

Another option in embodiments of the modulation removal stage 110 is depicted in FIG. 2h, where the embodiment of the modulation removal stage 210d comprises two synchronized front-end stages 213d and 214d. Both front-end stage produce base-band signals or CDMA signals, which are also termed "BB_signal1" and "BB_signal2" in FIG. 2h. A multiplier 215d multiplies the two base-band signals before they are filtered and downsampled in the filter and downsampling stage 212d. The filter and downsampling stage 212d corresponds to one of the embodiments as discussed above. Since the two signals of the front-end stages 213d and 214d are synchronized, they can be coherently combined by the multiplier 215d. In other embodiments the two signal copies are independent, i.e. obtained by, for example, different receive antennas. Therewith, independent noise present in the two signal copies superimpose statistically, i.e. incoherently, while the signal parts superimpose coherently. Therewith, the SNR of the signal can be further improved.

FIG. 2i depicts a corresponding embodiment for the intermediate-band, in which the CDMA signals, termed "IF_signal 1" and "IF_signal 2", correspond to intermediate frequency signals. In FIG. 2i the two front end stages 213d and 214d provide the intermediate signals, which are synchronous. As described above for FIG. 2h the multiplier 215d may combine the two intermediate-band signals coherently. The following processing is similar as for the embodiment depicted in FIG. 2h.

In embodiments the modulation removal stage 110 can be adapted for removing the data modulation by a multiplication operation of the CDMA signal and an independent and synchronized copy of the CDMA signal. In embodiments the modulation removal stage 110 can be adapted for filtering and/or downsampling the modified CDMA signal.

The filtering and/or downsampling may comprise an integration, a low-pass filtering, a rectification, an averaging and/or a mean value operation of the modified CDMA signal. The frequency shift detector 130 can be adapted for detecting the candidate frequency shifts by a threshold detection of the modified CDMA spectrum and by considering as a candidate frequency shift half of a frequency for which the threshold is detected.

As already mentioned, the length of the FFT blocks, 220a, 220b, 220c, and 220d effects the output SNR, i.e., the ability to detect the peaks will vary proportionally with the length of the FFT. FIG. 2h illustrates an embodiment wherein the signal power can be increased by replacing the squaring module with the multiplier 215d and the two base-band branches 213d and 214d, corresponding to the two synchronized front-ends.

The outcome of the embodiments depicted in FIGS. 2a to 2i are shown in FIG. 3. FIG. 3 shows a power density spectrum for a real recorded GPS signal, obtained using one of the modules according to FIGS. 2a to 2i. Note, that it is not the exact power density spectrum due to the squaring or multiplying operation. The frequencies detected from the density depicted in FIG. 3 will have to be divided by a factor of 2. As can be seen, the users or transmitters or codes present and their frequency shifts are easily distinguishable. At this point, however, a receiver has no hint to the CDMA codes or the respective indices within those signals. Moreover, no information about the CDMA code phase or time shift is available. However, as can be seen in FIG. 3, from all the possible frequency shifts only a group of candidate frequency shifts is possible, which can in embodiments significantly narrow down the search for the frequency shift.

Figure 4A:
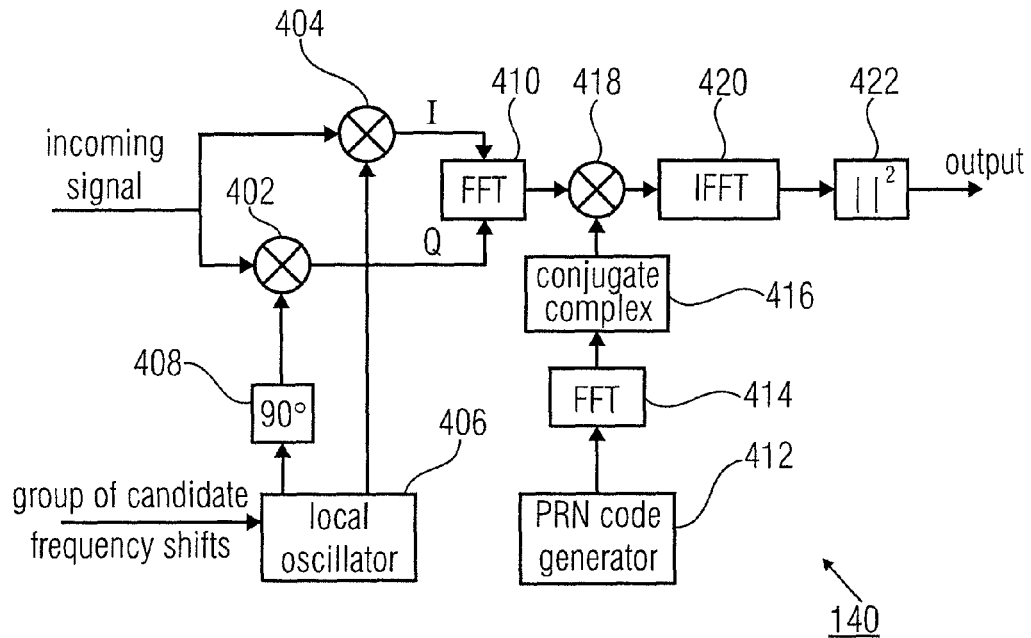
FIG. 4a illustrates another embodiment of an apparatus for estimating a frequency shift and a time shift.

FIG. 4a illustrates an embodiment of the processing stage 140. As an input, the embodiment of the processing stage 140 takes the CDMA signal, which is also termed incoming signal in FIG. 4a, and the group of candidate frequency shifts is determined as described above. Based on the group of candidate frequency shifts a local oscillator 406 generates a signal based on one of the candidate frequency shifts. In multipliers 402 and 404 two copies of the CDMA signal can be demodulated or downmixed based on the respective candidate frequency shift. The phase shifter 408 shifts one copy of the signal generated by the local oscillator 406 in order to enable multiplier 402 to determine the quadrature component of the downmixed or demodulated signal. The resulting demodulated candidate CDMA signal is associated with the candidate frequency shift from the group of candidate frequency shifts.

The frequency domain transformer 410, which is exemplified as an FFT in the embodiment depicted in FIG. 4a, transforms the candidate CDMA signal to the frequency domain to obtain a candidate CDMA spectrum. As mentioned above, as frequency domain transformer 410 multiple frequency transformations may be realized, as for example FFT, DFT, DCT, MDCT, etc. In the embodiment depicted in FIG. 4a a local PRN code generator generates a copy of the CDMA code, identifying the respective transmitter, user, or signal, which is to be determined from the CDMA signal. The PRN code generator 412 is indicated by block 412 in FIG. 4a. The locally generated copy of the CDMA code is then transformed to the frequency domain by the frequency domain transformer 414, which is again exemplified as an FFT, but not limited thereto. In the embodiment depicted in FIG. 4a the resulting spectrum of the CDMA code is then complex conjugated in block 416 before being multiplied by multiplier 418 with the candidate CDMA spectrum. The time domain transformer 420 then transforms the combination of the candidate CDMA spectrum and the frequency transformed version of the CDMA code to the time domain to obtain a combined candidate CDMA signal.

In step 422 the time shift can then be detected based on the combined candidate CDMA signal by evaluating its power distribution as it corresponds to the cross-correlation function between the locally generated CDMA code and the received signal, where the peak indicates the respective time shift. The processing stage 140 can then be further adapted for selecting the candidate frequency shift associated with the demodulated candidate CDMA signal as the frequency shift.

In other words, the processing stage 140 can be adapted for demodulating the CDMA signal by mixing or multiplying the CDMA signal with the sinusoidal having as frequency the candidate frequency shift.

Moreover, in embodiments the processing stage 140 can be adapted for combining the candidate CDMA spectrum and the frequency transformed version of the CDMA code by multiplying the candidate CDMA spectrum and the complex conjugate of the frequency transformed CDMA code.

The processing stage 140 can be further adapted for detecting the time shift based on a threshold detection wherein the optimization criterion may correspond to the combined candidate signal exceeding the threshold.

Figure 4B:
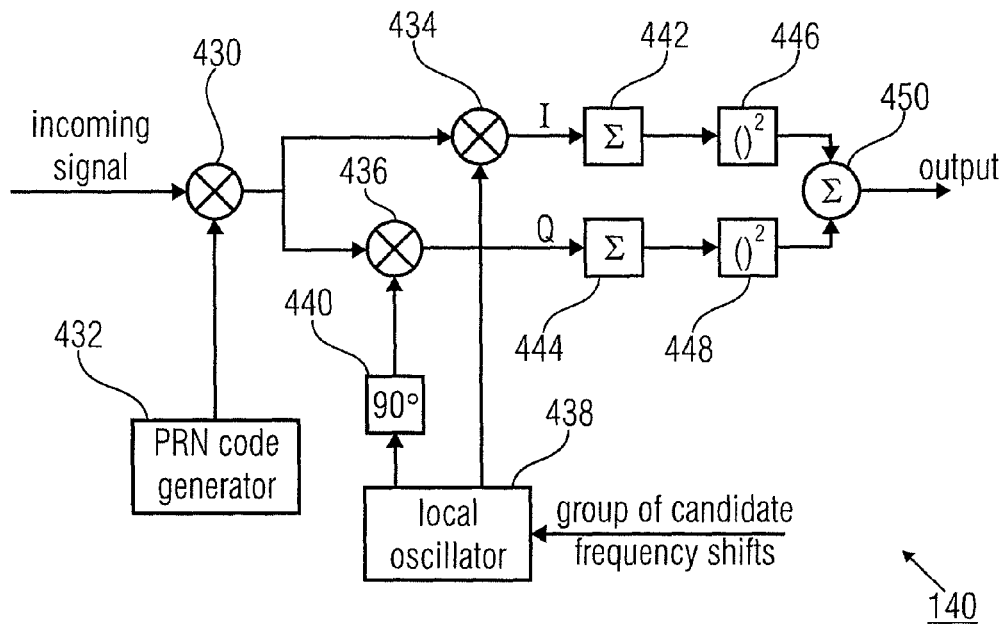
FIG. 4b illustrates another embodiment of an apparatus for estimating a frequency shift and a time shift.

Another embodiment of a processing stage 140 will be detailed with the help of FIG. 4b. As shown in FIG. 4b, multiplier 430 multiplies an incoming signal with a locally generated code, which is generated by the PRN (Pseudo-Random Noise) code generator 432. The incoming signal may correspond to a CDMA signal, in an intermediate-band or a base-band version. In other words, according to equations 1 and 1a as described above, the incoming signal may be a superposition of multiple code sequences. The locally generated PRN code corresponds to one single time shift. In other words, the PRN code generator 432 generates codes with different time shifts, more specifically, one code for which the acquisition is carried out is generated by the PRN code generator 432 over and over again, however, with different time shifts according to the above described code bins. For each of the time shifted versions of this code, another output will be produced by the multiplier 430. In other words, the processing stage 140 in this embodiment is adapted such that the processing comprises combining the CDMA signal and the CDMA code based on a candidate time shift to obtain a candidate decoded CDMA signal, where a candidate time shift corresponds to one of the time shifts or code bins.

The output of the multiplier 432 is input into two more multipliers 434 and 436, where the signal is multiplied with a locally generated carrier signal, its quadrature component, respectively. As can be seen in FIG. 4b, the carrier signal is locally generated by local oscillator 438 and corresponds to one frequency bin or frequency shift. Its quadrature component is produced by the phase shifter 440 before being multiplied with the output of the multiplier 430. The results are the in-phase and quadrature components for one time shift and frequency shift combination, i.e. one combination of a code bin and a frequency bin or a combination of one candidate time shift and one candidate frequency shift. In other words, the processing stage 140 in this embodiment is adapted such that the processing comprises demodulating the candidate decoded CDMA signal based on the candidate frequency shift from the group of candidate frequency shifts to obtain a demodulated candidate decoded CDMA signal.

The two outputs of the multipliers 434 and 436 are then accumulated in the accumulators 442 and 444 before their respective powers are evaluated by the processing blocks 446 and 448. The processing stage 140 in this embodiment can be adapted such that the processing further comprises accumulating the demodulated candidate decoded CDMA signal to obtain an accumulated candidate CDMA signal. The power signals are then added by adder 450, resulting in the output signal for one frequency bin and code bin combination, i.e., referring to FIG. 6, for one correlation value for one cell. The processing stage 140 in this embodiment can be adapted such that the processing further comprises detecting the time shift based on the accumulated candidate CDMA signal when the accumulated candidate CDMA signal fulfills an optimization criterion and for selecting the candidate frequency shift associated with the demodulated candidate decoded CDMA signal as the frequency shift. According to the above embodiment, the correlation peaks have to be searched only within the group of candidate frequency shifts, narrowing the extend of the search.

Further embodiments may be implemented as a GPS or Galileo receiver comprising an embodiment of the above-described apparatuses.

Figure 7:
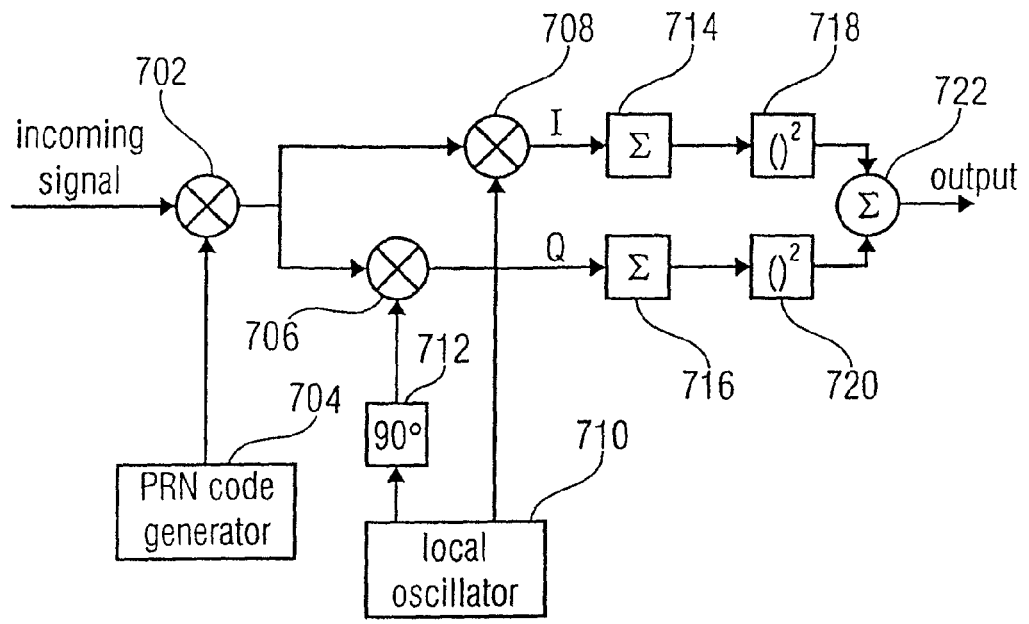
FIG. 7 illustrates a state-of-the-art serial acquisition search.
Figure 9:
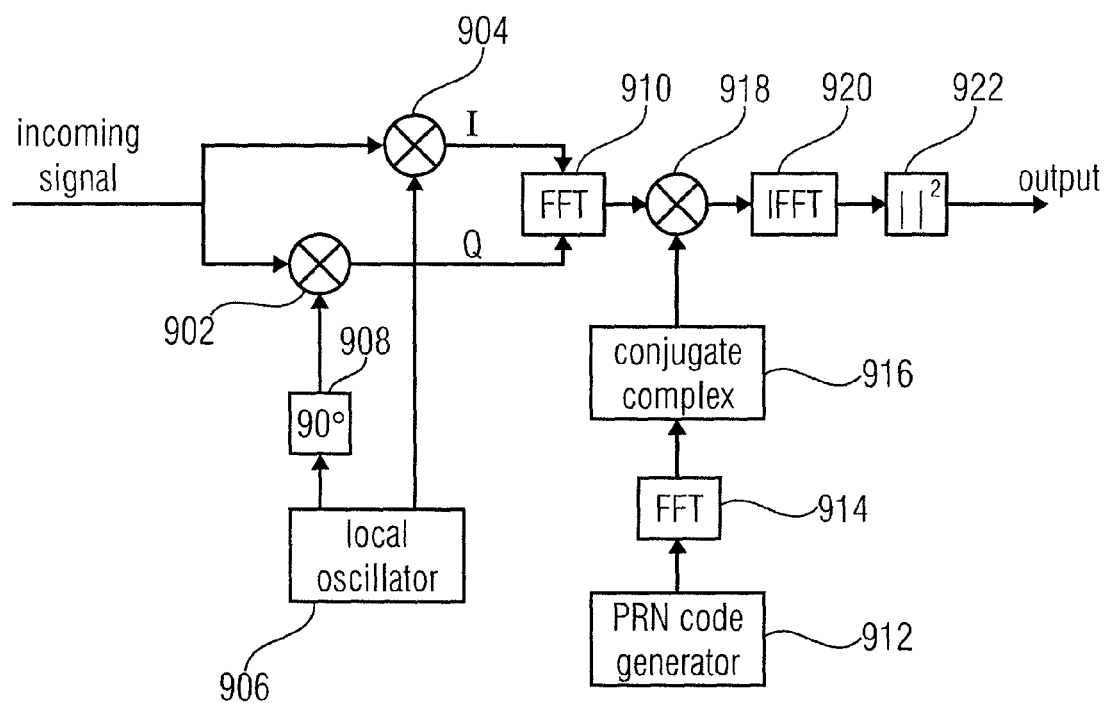
FIG. 9 illustrates a state-of-the-art acquisition with parallelization of the code phase search.

In embodiments after the group of candidate frequency shifts is detected, the further signal processing may be similar to the one as it was described with respect to FIG. 7 or FIG. 9, however, based on the reduced set of frequency shifts comprised in the group of candidate frequency shifts. Since less Doppler bins or frequency shifts have to be evaluated, significant savings can be obtained with respect to complexity and time.

Embodiments therewith provide the advantage that a new and less time requiring acquisition process can be performed, because of the evaluation of the group of candidate frequency shifts. Therewith, time and frequency parallelization can be achieved. Embodiments have been tested on real GPS signals, cf. FIG. 3, where significantly reduced acquisition times could be achieved.

Depending on certain implementation requirements of the inventive methods, the inventive methods can be implemented in hardware or in software. The implementation can be performed using a digital storage medium, in particular a disc, a DVD, a Blue-ray disc, or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concept disclosed herein and comprehended by the claims that follow.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for estimating a frequency shift and a time shift in a CDMA signal based on a CDMA code associated with a CDMA signal, comprising:
    a modulation removal stage for removing a data and CDMA code modulation from the CDMA signal to acquire a modified CDMA signal;
    a frequency domain transformer for transforming the modified CDMA signal to the frequency domain to acquire a modified CDMA spectrum;
    a frequency shift detector for detecting a group of candidate frequency shifts based on the modified CDMA spectrum;
    a processing stage for processing the CDMA signal and a candidate frequency shift to acquire the time shift, when a combination of the CDMA signal, the CDMA code and the candidate frequency shift fulfills an optimization criterion and for selecting the candidate frequency shift as the frequency shift; and
    a controller for controlling the processing stage such that candidate frequency shifts from the group of candidate frequency shifts are processed and the time shift is detected.

2. The apparatus of claim 1, wherein the processing stage is adapted such that the processing comprises
    demodulating the CDMA signal based on the candidate frequency shift from the group of candidate frequency shifts to acquire a demodulated candidate CDMA signal associated with the candidate frequency shift;
    transforming the demodulated candidate CDMA signal to the frequency domain to acquire a candidate CDMA spectrum;
    transforming a combination of the candidate CDMA spectrum and a frequency transformed version of the CDMA code to the time domain to acquire a combined candidate CDMA signal;
    detecting the time shift based on the combined candidate CDMA signal when the combined candidate CDMA signal fulfills an optimization criterion and selecting the candidate frequency shift associated with the demodulated candidate CDMA signal as the frequency shift.

3. The apparatus of claim 1, wherein the processing stage is adapted such that the processing comprises
    combining the CDMA signal and the CDMA code based on a candidate time shift to acquire a candidate decoded CDMA signal;
    demodulating the candidate decoded CDMA signal based on the candidate frequency shift from the group of candidate frequency shifts to acquire a demodulated candidate decoded CDMA signal;
    accumulating the demodulated candidate decoded CDMA signal to acquire an accumulated candidate CDMA signal; and
    detecting the time shift based on the accumulated candidate CDMA signal when the accumulated candidate CDMA signal fulfills an optimization criterion and for selecting the candidate frequency shift associated with the demodulated candidate decoded CDMA signal as the frequency shift.

4. The apparatus of claim 1, wherein the controller is for controlling the processing stage in an iterative sequence, such that the candidate frequency shifts from the group of candidate frequency shifts are iterated until the time shift is detected.

5. The apparatus of claim 1, wherein the controller is for controlling the processing stage in parallel such that all frequency shifts from the group of frequency shifts are processed in parallel.

6. The apparatus according to claim 1, wherein the modulation removal stage is for removing the data modulation by means of a squaring operation on the CDMA signal.

7. The apparatus according to claim 1, wherein the modulation removal stage is for removing the data modulation by a multiplication operation of the CDMA signal and an independent and synchronized copy of the CDMA signal.

8. The apparatus of claim 1, wherein the modulation removal stage is for filtering and/or downsampling the modified CDMA signal.

9. The apparatus of claim 8, wherein the filtering and/or the downsampling comprises an integration, a low-pass filtering, a rectification, an averaging and/or a mean value operation of the modified CDMA signal.

10. The apparatus according to claim 1, wherein the frequency shift detector is adapted for detecting the candidate frequency shifts by a threshold detection of the modified CDMA spectrum and by considering as a candidate frequency shift half of a frequency for which the modified CDMA spectrum exceeds the threshold.

11. The apparatus of claim 1, wherein the processing stage is for demodulating the CDMA signal or the candidate decoded CDMA signal by mixing or multiplying the CDMA signal or the candidate decoded CDMA signal with a sinusoidal comprising as frequency the candidate frequency shift.

12. A GPS receiver comprising an apparatus for estimating a frequency shift and a time shift in a CDMA signal based on a CDMA code associated with a CDMA signal, comprising:
a modulation removal stage for removing a data and CDMA code modulation from the CDMA signal to acquire a modified CDMA signal;
a frequency domain transformer for transforming the modified CDMA signal to the frequency domain to acquire a modified CDMA spectrum;
a frequency shift detector for detecting a group of candidate frequency shifts based on the modified CDMA spectrum;
a processing stage for processing the CDMA signal and a candidate frequency shift to acquire the time shift, when a combination of the CDMA signal, the CDMA code and the candidate frequency shift fulfills an optimization criterion and for selecting the candidate frequency shift as the frequency shift; and
a controller for controlling the processing stage such that candidate frequency shifts from the group of candidate frequency shifts are processed and the time shift is detected.

13. A method for estimating a frequency shift and a time shift in a CDMA signal based on a CDMA code associated with the CDMA signal, comprising:
removing a data modulation from the CDMA signal to acquire a modified CDMA signal;
transforming the modified CDMA signal to the frequency domain to acquire a modified CDMA spectrum;
detecting a group of candidate frequency shifts based on the modified CDMA spectrum;
processing the CDMA signal and a candidate frequency shift to acquire the time shift, when a combination of the CDMA signal, the CDMA code and the candidate frequency shift fulfills an optimization criterion and for selecting the candidate frequency shift as the frequency shift; and
controlling the processing such that candidate frequency shifts from the group of candidate frequency shifts are processed and the time shift is detected.

14. A non-transitory computer-readable storage medium storing a computer program comprising a program code for performing the method for estimating a frequency shift and a time shift in a CDMA signal based on a CDMA code associated with the CDMA signal, comprising:
removing a data modulation from the CDMA signal to acquire a modified CDMA signal;
transforming the modified CDMA signal to the frequency domain to acquire a modified CDMA spectrum;
detecting a group of candidate frequency shifts based on the modified CDMA spectrum;
processing the CDMA signal and a candidate frequency shift to acquire the time shift, when a combination of the CDMA signal, the CDMA code and the candidate frequency shift fulfills an optimization criterion and for selecting the candidate frequency shift as the frequency shift; and
controlling the processing such that candidate frequency shifts from the group of candidate frequency shifts are processed and the time shift is detected,
when the computer program runs on a computer processor.

* * * * *